(12) United States Patent
Rajput et al.

(10) Patent No.: US 11,652,841 B2
(45) Date of Patent: May 16, 2023

(54) SYSTEM AND METHOD FOR DETECTING BOTS BASED ON ITERATIVE CLUSTERING AND FEEDBACK-DRIVEN ADAPTIVE LEARNING TECHNIQUES

(71) Applicant: KAALBI TECHNOLOGIES PRIVATE LIMITED, Bengaluru (IN)

(72) Inventors: Mohit Rajput, Bangalore (IN); Harisankar Haridas, Bengaluru (IN); Rakesh Thatha, Bengaluru (IN); Sonal Laichand Oswal, Bengaluru (IN); Neeraj Kumar Gupta, Bengaluru (IN)

(73) Assignee: KAALBI TECHNOLOGIES PRIVATE LIMITED, Bengaluru (IN)

( * ) Notice: Subject to any disclaimer, the term of this patent is extended or adjusted under 35 U.S.C. 154(b) by 647 days.

(21) Appl. No.: 16/574,549

(22) Filed: Sep. 18, 2019

(65) Prior Publication Data

US 2020/0099713 A1 Mar. 26, 2020

(30) Foreign Application Priority Data

Sep. 21, 2018 (IN) .............................. 201841035715

(51) Int. Cl.
*H04L 9/40* (2022.01)
*G06F 17/18* (2006.01)
*G06N 20/00* (2019.01)

(52) U.S. Cl.
CPC .......... *H04L 63/1441* (2013.01); *G06F 17/18* (2013.01); *G06N 20/00* (2019.01)

(58) Field of Classification Search
CPC ........... H04L 63/1441; H04L 2463/144; H04L 63/1425; G06F 17/18; G06N 20/00; G06N 5/046; G06N 20/20
See application file for complete search history.

(56) References Cited

U.S. PATENT DOCUMENTS

| | | | | |
|---|---|---|---|---|
| 2010/0313264 | A1* | 12/2010 | Xie ....................... | H04L 63/101 726/22 |
| 2016/0342903 | A1* | 11/2016 | Shumpert ............. | G06F 11/008 |
| 2018/0314835 | A1* | 11/2018 | Dodson ................. | G06F 21/552 |
| 2018/0322363 | A1* | 11/2018 | Urmanov ................ | G06F 15/76 |
| 2019/0058719 | A1* | 2/2019 | Kar ..................... | H04L 63/1416 |

* cited by examiner

*Primary Examiner* — Meng Li
(74) *Attorney, Agent, or Firm* — M&B IP Analysts, LLC (57) ABSTRACT

A system and method for detecting and blocking bots are presented. The method includes receiving unlabeled data regarding a visitor of a web source, grouping the received unlabeled data with similar characteristics into a group of data, detecting, based on the group of data, at least one anomaly, and determining, based on the at least one detected anomaly, several visitors to be blacklisted.

21 Claims, 6 Drawing Sheets

SYSTEM AND METHOD FOR DETECTING BOTS BASED ON ITERATIVE CLUSTERING AND FEEDBACK-DRIVEN ADAPTIVE LEARNING TECHNIQUES

CROSS-REFERENCE TO RELATED APPLICATIONS

This application claims the benefit of an Indian Provisional Application No. 201841035715, filed on Sep. 21, 2018, the contents of which are hereby incorporated by reference.

TECHNICAL FIELD

The embodiments herein are related to a field of access control in accessing web applications and data. The embodiments herein are particularly related to a system and method for detecting and classifying visitors accessing web data and internet as human or bot. The embodiments herein are more particularly related to a system and method for automatically detecting bots using iterative clustering and feedback-driven adaptive learning.

BACKGROUND

Bots are software applications which perform automated tasks like interacting with web properties like websites and web-based Application Programming Interfaces (APIs). Not all bots are bad, but many are increasingly involved in unethical and illegal activities. These activities generally include web scraping, spamming, advertising fraud, etc. When multiple web-connected devices run a set of bots, this setup is called a 'botnet'.

For bot detection, multiple types of information are extracted from the visitors, such as HyperText Transfer Protocol (HTTP) headers, cookies, Internet Protocol (IP) address, browser or program parameters, visitors' interaction events such as mouse movements, clicks, button press, etc. Different types of bots also have diverse levels of advancement in their ability to emulate humans.

A complex set of structured streaming data are analyzed to distinguish between bot and human traffic. The bot detection is achieved through rule-based systems. Such systems are problematic because a huge time investment is required to effectively identify bots. Also, such systems are unable to be generalized across multiple web properties, and they additionally suffer from low accuracy because of seasonality and mutation of the bots.

Another alternative to this problem is the use of supervised machine learning models for bot detection. The supervised learning models are trained using past data with clean labels. However, such an approach is difficult in bot detection due to an inability of a past system to detect new or mutated bots.

An unsupervised learning model is also used to develop groups or anomalies to identify a plurality of hidden patterns. An unsupervised machine learning model does not rely on past labels, and hence much less time is spent on cleaning or estimating the true label of the observation. Unsupervised learning models also help in identifying bots with anomalous characteristics (anomaly detection) and sets of bots having similar patterns (clustering). However, with the implementation of unsupervised learning for bot detection, the question of whether a group or anomaly is composed of bots or humans remains. Further, the possible number of groups present in a clustering are not inherently known, and this technique suffers from the limitation in mapping groups to bot or humans.

In view of the above discussion, there is a need for a solution for bot detection that would overcome the deficiencies noted above.

SUMMARY

A summary of several example embodiments of the disclosure follows. This summary is provided for the convenience of the reader to provide a basic understanding of such embodiments and does not wholly define the breadth of the disclosure. The summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

The embodiments herein provide for a system and method for detecting and blocking bots. The method includes receiving unlabeled data regarding a visitor of a web source, grouping the received unlabeled data with similar characteristics into a group of data, detecting, based on the group of data, at least one anomaly, and determining, based on the at least one detected anomaly, a number of visitors to be blacklisted.

In another exemplary embodiment, a non-transitory computer readable medium having stored thereon instructions for causing a processing circuitry to execute a process, the process receiving unlabeled data regarding a visitor of a web source, grouping the received unlabeled data with similar characteristics into a group of data, detecting, based on the group of data, at least one anomaly, determining, based on the at least one detected anomaly, a number of visitors to be blacklisted, and storing the determined number of visitors to be blacklisted in a database.

In another exemplary embodiment, a system for detecting bots includes a processing circuitry, and a memory, the memory containing instructions that, when executed by the processing circuitry, configure the system to receiving data regarding a visitor of a web source, grouping the received unlabeled data with similar characteristics into a group of data, detecting, based on the group of data, at least one anomaly, determining, based on the at least one detected anomaly, a number of visitors to be blacklisted, and storing the determined number of visitors to be blacklisted to the memory.

These and other aspects of the embodiments herein will be better appreciated and understood when considered in conjunction with the following description and the accompanying drawings. It should be understood, however, that the following descriptions, while indicating the preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The foregoing and other objects, features and advantages of the disclosure will be apparent from the following detailed description taken in conjunction with the accompanying drawings.

FIG. 6 is schematic diagram of a bot detection system according to an embodiment Although the specific features of the embodiments herein are shown in some drawings and not in others. This is done for convenience only as each feature may be combined with any or all of the other features in accordance with the embodiments herein.

DETAILED DESCRIPTION

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that other changes may be made without departing from the scope of the embodiments. The following detailed description is therefore not to be taken in a limiting sense.

The embodiments herein provide a system and method for detecting and classifying visitors accessing web data and internet as human or bot using adaptive learning techniques. Also, the embodiments herein provide a system and method for automatically detecting bots using adaptive learning techniques coupled with an iterative clustering and feedback-driven adaptive learning. Further, the embodiments herein provide a system and method for ensembling of clustering algorithms to detect bots. Further, the embodiments herein develop a system and method to provide a binning procedure based on website id, IP address, hour combination, etc.

The embodiments herein also provide a system and method for combining clustering and anomaly detection in detecting bots. Further, the embodiments herein provide a system and method using a feedback-driven adaptive algorithm to detect bots and selecting the number of visitors to be blacklisted. Also, the embodiments herein provide a system and method employing Thompson sampling-based method to iteratively blacklist bot clusters.

Further, the embodiments herein provide a system and method incorporating information on previously identified bot in the adaptive algorithm for bot detection.

Also, the embodiments herein provide a system and method to train and predict phases to speed up clustering through a time window-based iteration procedure.

The embodiments herein will become readily apparent from the following detailed description taken in conjunction with the accompanying drawings.

That is, the various embodiments of the embodiments herein provide a system and method for automatically detecting bots using iterative clustering and feedback-driven adaptive learning. In an example embodiment, the disclosed system includes two main components. The two main components include an Iterative Clustering and Learning based System to Separate Traffic Apart (ICLSSTA) component and an Adaptive Action Taking component (AAT). The ICLSSTA component is configured to generate behavior-based clusters using unsupervised learning, and the AAT component is a feedback-driven adaptive learning based action taking component.

According to one embodiment of the embodiments herein, the ICLSSTA component is configured to act as a first component responsible in receiving/collecting/acquiring visitors' data and grouping visitors behaving in a similar manner together into one/single group. The AAT component is configured to serve as the second component which uses the past action information and feedback on these and decides on actions to be take on the visitors.

According to one embodiment of the embodiments herein, the ICLSSTA component is configured to employ/use engineered features, which represent users' behavior, to perform behavior based grouping of users. The ICLSSTA component is configured to detect observations that are anomalies, conceptually drifted observations and observations forming clusters. Additionally, multiple dimensional transformations are coupled with the algorithms to generate results with each algorithm in a process combination. The ICLSSTA component is configured to save one or more bot observations with each iteration to a bot database and to mix one or more observations with the current iteration data to better identify the bot clusters/groups. These multiple results are ensembled in the end to generate a single result file. A training and prediction engine is provided to make the present embodiment scalable, computationally cheap, fast, and robust.

According to one embodiment of the embodiments herein, the AAT component is configured to judge/estimate/determine a number of visitors to be blacklisted per iteration. The AAT component is also configured to decide the number of visitors and specific visitors to be blacklisted from available clusters. The first task of judging/estimating a size of the iteration is achieved by using a probability-based solution. The second task of selecting and estimating a number of visitors is performed by Thompson Sampling technique. Both these tasks make use of the feedback for an action that is taken. An additional logic is provided to ensure that bots solving captchas do not impact a quality of feedback.

According to one embodiment of the embodiments herein, a plurality of identifier components are provided. A visitor is identified by a web property identity (e.g., the website id), bin identity and IP address of the device used. The Bin id is an identifier of each window of a certain timeframe present in a timeline w.r.t a current time. The bin ids also serve as a grouping identifier, when a plurality of features is aggregated, so that these plurality of features are aggregated only in a particular time frame. Thus, the Bin id enables to distinguish between the visitors that are old and new with same IP address. One logic of implementing the bin ids is to have different identifiers for the same IP, as an IP may be allocated to a plurality of visitors. Another logic of implementing the bin ids is to reduce a weightage of a past behavior of the IP by considering the behavior in only a certain/preset time frame.

According to one embodiment of the embodiments herein, a plurality of engineered features are provided and used by ICLSSTA. The plurality of engineered features include information related to visitor session, cookie capability, IP sharing, browser activity, web interaction, time based information, etc. Each of the plurality of features is computed for a plurality of visitors, and wherein a visitor is identified based on the Website ID, the bin ID, and the IP address.

According to one embodiment of the embodiments herein, an input dataset is created. The data set is created by adding a majority of observations from a current data stream and some observations containing only bot signatures explicitly. This combined dataset of engineered features is then pre-processed and the features are transformed using some standard and user-defined mathematical functions.

According to one embodiment of the embodiments herein, the ICLSSTA component is configured to run and execute ICLSSTA Algorithms. After the creation of data set, the ICLSSTA component is configured to implement multiple algorithm pairs of dimension transformation and anomaly/conceptual drift/clustering algorithm on the created data set to generate plurality of results. The algorithm pair includes PCA followed by kmean, ICA followed by DBSCAN, LDA followed by Isolation Forest, etc. Also, these models are locally saved in train cycle so that the plurality of algorithm pair is used in a predictive cycle. Any data scaling technique is also selected with these algorithm pairs. Additionally, multiple statics of the data at each data processing steps per training iteration are preserved/stored. This is performed to reproduce data by using the same statistic of that of train cycle when predictive setting is used and additionally to assess conceptual drift for observations.

According to one embodiment of the embodiments herein, the ICLSSTA component is configured to perform an ensembling process. A plurality of results generated using the plurality of algorithm pairs is ensembled into a single result file. During the ensembling process, the ICLSSTA component is configured to ensemble results for the observations that are considered as extreme outlier, and/or conceptually drifted observation, and observations that consider information of anomaly scores and clustering-based information related to the visitors. In order to perform ensembling, the algorithm is started/executed to convert all score-based results into bins in a first step and these bins are considered as clusters. This is followed by combining the plurality of converted score-based clusters and the plurality of cluster results into a single file. The way of combining the plurality of results for visitors is based on projecting each result onto other results such that an information similar to that of Venn diagrams is provided/obtained. Further, these visitors, who are removed based on a fact that these visitors are either considered as extreme outlier or as conceptually drifted, are added to the ensembled result file under the cluster name of either extreme outlier or conceptually drifted. The pairs of processes to be used and the way to ensemble are designed such that the anomalous visitors (based on past label) form base clusters.

According to one embodiment of the embodiments herein, an Adaptive Action Taking (AAT) component is provided. The Adaptive Action Taking component is configured to accept the ensembled information of visitors, feedback status of the previous iterations, to judge, select and start taking actions against visitors or a set of visitors which are suspected as bots. The actions include exhibiting/displaying a block page, exhibiting/displaying captcha, enforcing multi-factor authentication etc. Feedback like captcha solving is available/provided to an adaptive learner component. The feedback is used by an adaptive learner component to learn/understand the model settings (e.g., appropriate thresholds on the anomaly scores).

In an embodiment, the main problem dealt by AAT component include estimating the number of visitors to be blacklisted in each iteration, judging/determining the number of visitors to be blacklisted from each cluster and in determining/choosing the visitors to be selected from a cluster. The number of visitors to be selected per iteration is computed by a formula which is configured to compute the aggregated probability of visitor to reappear i.e. arrive again after it is blacklisted, and the probability of visitors which are blacklisted to solve captchas. Finally, this is coupled with the maximum allowed captcha being solved in this iteration and a tuning factor (less than 1 implies less aggressive, more than 1 implies more aggressive), which results in the number of visitors to be blacklisted in this iteration. Thus, the AAT component is configured to estimate the number of visitors per iteration to exhaust the fixed budget on the false positives (e.g., number of visitors, which solved captcha) in this iteration. Additionally, a safe minimum blacklist limit is provided for each iteration for the exploration to proceed. Still further, another maximum blacklist limit is provided to keep blacklisting within limits.

According to one embodiment of the embodiments herein, the system is configured to keep a check on illegitimate captcha solving. There are certain cases where the visitors solve the captcha illegitimately and these instances are not actual false positive cases. Some of the reasons behind illegitimate captcha solving include presence of IP sharing, Human Bot master, Captcha sweatshops and advance bots solving captcha. A basic identification of such cases is performed by evaluating/judging whether the IP is shared between a plurality of visitors, or when large amount of time is taken/consumed by a visitor to solve the captcha, or a visitor solved the captcha very fast, or when the visitor's actions using the mouse and keyboard are found to be suspicious, or when the cookie capability and browser configuration are found to be highly suspicious.

According to one embodiment of the embodiments herein, a system is provided for automatically detecting bots using iterative clustering and feedback-driven adaptive learning. The system includes a Bot Detection component, a Server-side Connector component, a Third-Party API Clients component, a Web Browser component and a Mobile Application component. The Third-Party API Clients component is configured to connect with the Server-side Connector component for sending API requests and receiving API responses. The Server-side Connector component is configured to connect to the Bot Detection component for sending server-side API call and receive suggested actions from the Bot Detection component. The Server-side Connector component is also configured to connect to the Mobile Application component for receiving mobile application API calls and sending mobile application API call responses. The Server-side Connector component is also configured to connect to the Web Browser component for receiving HTTP requests and sending HTTP responses with cookies. The Bot Detection component is configured to receive application parameters from the Mobile Application component and JavaScript parameters from the Web Browser component.

According to one embodiment of the embodiments herein, a bot detection component is provided. The bot detection component includes a Current Unlabeled Data component, a Past Bot Data component, a Feature Preprocessing and Dimension Transformation, an Anomaly Detector component, a Conceptual Drift Detector, a Cluster Detector component, an Ensembling component, a Business level limit component, an Adaptive learner component, a Blacklisted component and a Feedback component. The Current Unlabeled Data component includes current data received from stream of information. The Past Bot Data component includes previous bot signature database. The Feature Preprocessing and Dimension Transformation transforms the input dataset.

The Anomaly Detector component, a Conceptual Drift Detector and a Cluster Detector component are configured for developing and saving models, training using saved models and testing, respectively. The Ensembling component is configured to combine the results and the Adaptive Learner component is configured to take actions based on the collected constraints from the business level limit component and the results from feedback component. The Blacklisted component and Feedback component are configured to send and display captcha feed to the visitor and to get the captcha feedback, which provides information on true positive and false positives.

According to one embodiment of the embodiments herein, a method for computing the number of visitors to be blacklisted in an iteration is provided. The method includes the following steps: a value of a tuning factor, lambd, business limit per day BLpD (i.e. maximum number of Captcha solved per day), number of iteration to occur per day, NpD, and min and max blacklisting bounds (BlMin, BlMax) are collected. A ratio of the total number of visitors that are blacklisted and have reappeared/arrived again to the total number of visitors which are blacklisted in a pre-set time-frame is computed. This is the probability of blacklisted visitor to arrive again [P(visitor arrival)]. A ratio of the total number of visitors which have solved the captcha to the total number of visitors which are blacklisted and have arrived again in a pre-set time frame. This is the probability of the visitor to solve Captcha [P(visitor solving captcha)]. The two computed probability values are multiplied to acquire a probability of visitor solving captcha when blacklisted; P(visitor arrival)×P(visitor solving captcha)=P(visitor solving captcha when blacklisted). The total number of false positives i.e. captcha solved per iteration (BLpI) is computed using the equation, BLpI=BLpd/NpD. The blacklist size of this iteration (StI) is computed using, the equation, StI= (lambda×BLpI)/(P(ip solving captcha when blacklisted)+ 0.1). The result is rounded off to a nearest integer value.

When StI<BlMin then StI=BlMin; or else if StI>BlMax then StI=BlMax and Return StI.

According to one embodiment of the embodiments herein, a method for selecting visitors from clusters is provided. The method includes the following steps of acquiring/collecting the Environment State, i.e. Feedback Data (captcha Solved, Unsolved), Visitors' cluster label information and Total Key To Blacklist (KB). The visitors are separated/sorted or classified using Cluster label information. Each cluster's total captcha solved (SC) and unsolved cases (UC) are computed. Each cluster's Reward and Regret are calculated using the equations, Reward=UC and Regret=exponent^SC. Beta Distribution of cluster suspicious scores which is a Function of Reward & Regret of this cluster are generated, for cluster in clusters. When the available key (AK) in this cluster>KB, KB Samples are drawn randomly from this cluster's beta distribution of suspicious scores. When the available key (AK) in this cluster<=KB, AK Samples are randomly drawn from this cluster's beta distribution of suspicious scores. The top KB samples such as samples having highest suspicious scores are selected. A corresponding number of visitors to be drawn from each individual cluster (KIC) is calculated/estimated/ determined. A most recent Visitors is selected according to KIC.

Figure 1:
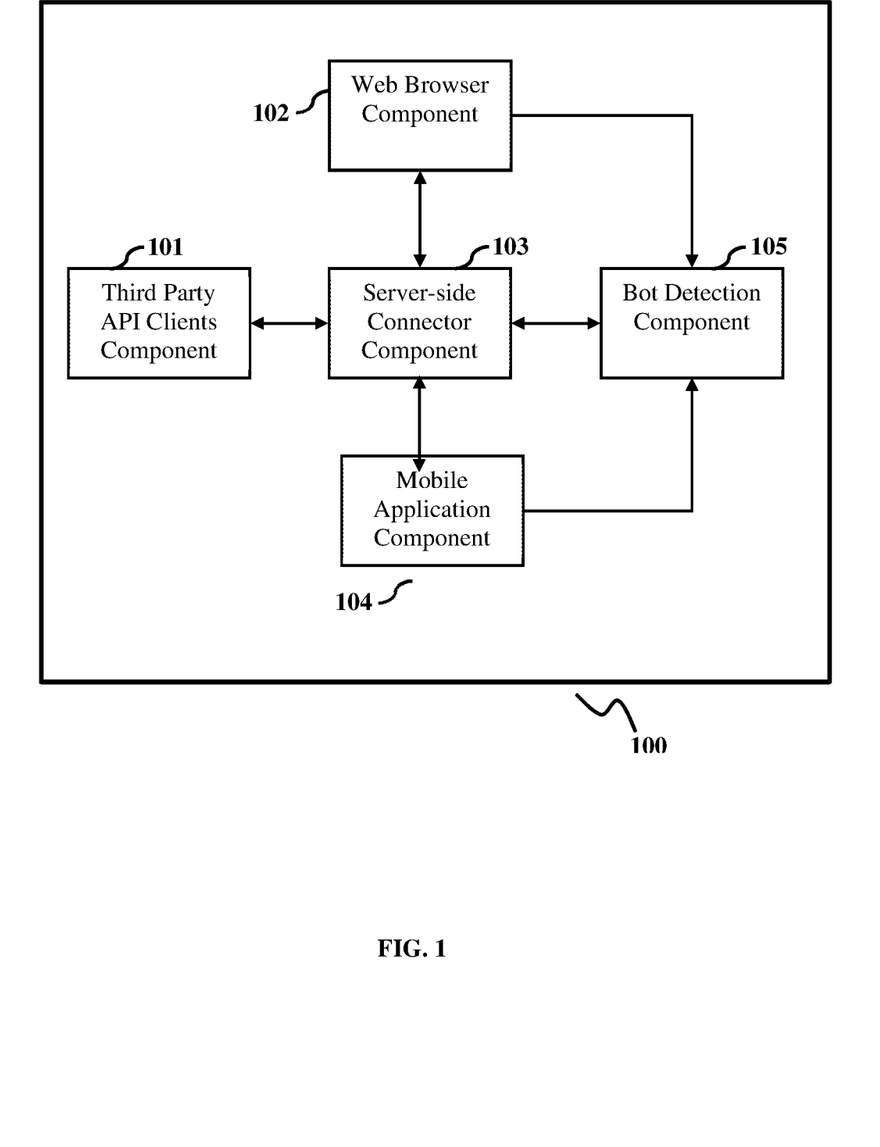
FIG. 1 is a block diagram of a system for automatically detecting bots using iterative clustering and feedback-driven adaptive learning, according to an embodiment herein.

FIG. 1 illustrates an overall block diagram of a system 100 for automatically detecting bots using iterative clustering and feedback-driven adaptive learning. The system 100 includes a plurality of computer modules, or a combination of software code components to be used by the system to perform tasks, and independent electronic circuits components packaged onto a circuit board to provide a basic function within a larger computer system. That is, the modules may include a combination of software code and circuits that make up the respective hardware components of the system. A processor may implement the software and use the software instruction to control the hardware. That is, the hardware may be configured to implement the software instructions to perform a variety of steps to detect bots automatically, as will be explained in detail below.

In an embodiment, the system 100 includes a Bot Detection component 105, a Server-side Connector component 103, a Third-Party Application Program Interface (API) Clients component 101, a Web Browser component 102 and a Mobile Application component 104. The Third-Party API Clients component 101 is configured to connect with the Server-side Connector component 103 for sending API requests and receiving API responses.

The Server-side Connector component 103 is configured to connect to the Bot Detection component 105 for sending server-side API call and receive suggested actions from the Bot Detection component 105. The Server-side Connector component 103 is also configured to connect to the Mobile Application component 104 for receiving mobile application API calls and sending mobile application API call responses. The Server-side Connector component 103 is also configured to connect to the Web Browser component 102 for receiving HTTP requests and sending HTTP responses with cookies. The Bot Detection component 105 is configured to receive application parameters from the Mobile Application component 104 and JavaScript parameters from the Web Browser component 102.

The various components shown in FIG. 1 can be implemented in hardware, software, or any combination thereof. Specifically, each, some, or all of the hardware elements may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), tensor processing units (TPUs), graphics processing unit (GPUs), and the like, or any other hardware logic components that can perform calculations or other manipulations of information.

Also, software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by a processing circuitry, cause the processing circuitry to perform the various processes described herein.

Figure 2:
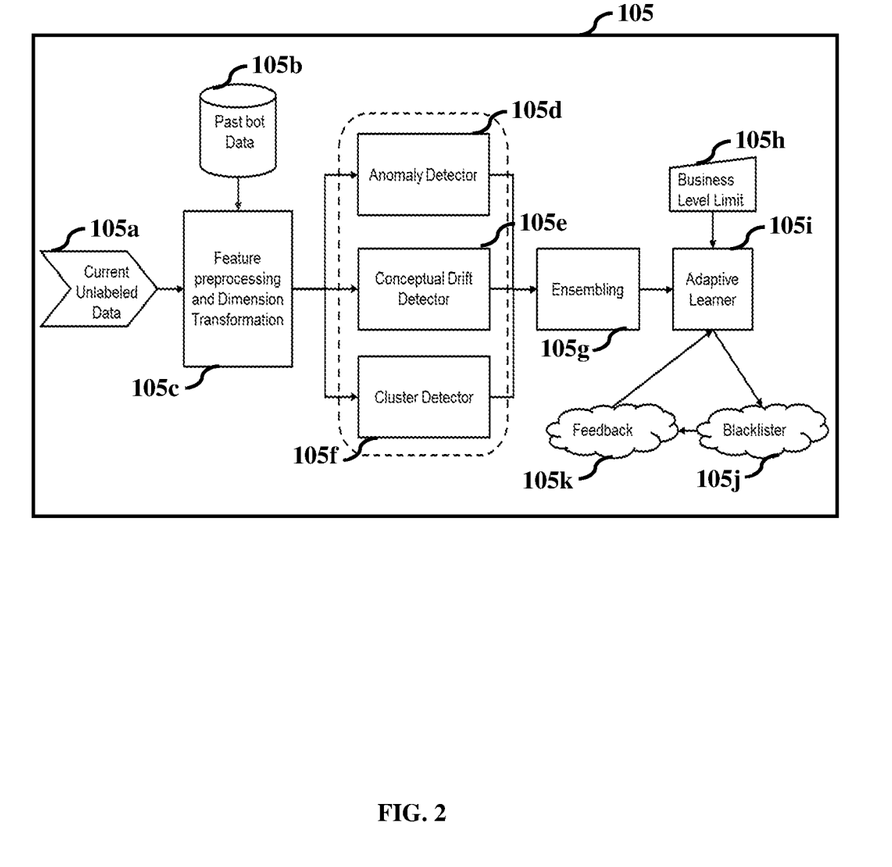
FIG. 2 is a block diagram of a bot detection component, according to an embodiment herein.

FIG. 2 illustrates a block diagram of a bot detection component 105, according to one embodiment of the embodiments herein. The bot detection component 105 includes a Current Unlabeled Data component 105a, a Past Bot Data component 105b, a Feature Preprocessing and Dimension Transformation component 105c, an Anomaly Detector component 105d, a Conceptual Drift Detector 105e, a Cluster Detector component 105f, an Ensembling component 105g, a Business level limit component 105h, an Adaptive learner component 105i, a Blacklisted component 105j and a Feedback component 105k.

The bot detection component 105 also includes a Current Unlabeled Data component 105a, a Past Bot Data component 105b, a Feature Preprocessing and Dimension Transformation 105c, an Anomaly Detector component 105d, a Conceptual Drift Detector 105e, a Cluster Detector component 105f, an Ensembling component 105g, a Business level limit component 105h, an Adaptive learner component 105i, a Blacklisted component 105j and a Feedback component 105k. The Current Unlabeled Data component 105a includes current data from stream of information. The Past Bot Data component 105b includes previous bot signature database.

The Feature Preprocessing and Dimension Transformation 105c is configured to transform the data received from the Current Unlabeled Data component 105a and the Past Bot Data component. The Anomaly Detector component 105d, a Conceptual Drift Detector 105e and a Cluster Detector component 105f are configured to respectively detect anomaly, concept drift, and clusters from the data. The detected information is then used for developing and saving models, training the system using saved models, and for further testing. The Ensembling component 105g is configured to combine the results received from the Anomaly Detector 105d, Conceptual Drift Detector 105e and Cluster Detector component 105f, and the Adaptive Learner component 105i is configured to take action based on the results received from the Ensembling component 105g, and based on constraints received from the Business level limit component 105h.

It is noted that "conceptual drift" refers to the change in the hidden relationship (e.g., hidden context that given explicitly in the form of predictive features) between input and output in the underlying problem over time. This change may be a gradual change over time, a recurring or cyclical change, or a sudden or abrupt change.

The Blacklisted component 105j is configured to conduct Completely Automated Public Turing test (CAPTCHA) regarding whether or not the current data provided by the Current Unlabeled Data Component 105a is provided by a human user or a bot based on information received from the Adaptive learner 105i. The Feedback component 105k is configured to provide captcha feedback regarding whether or not a user is human.

Figure 3:
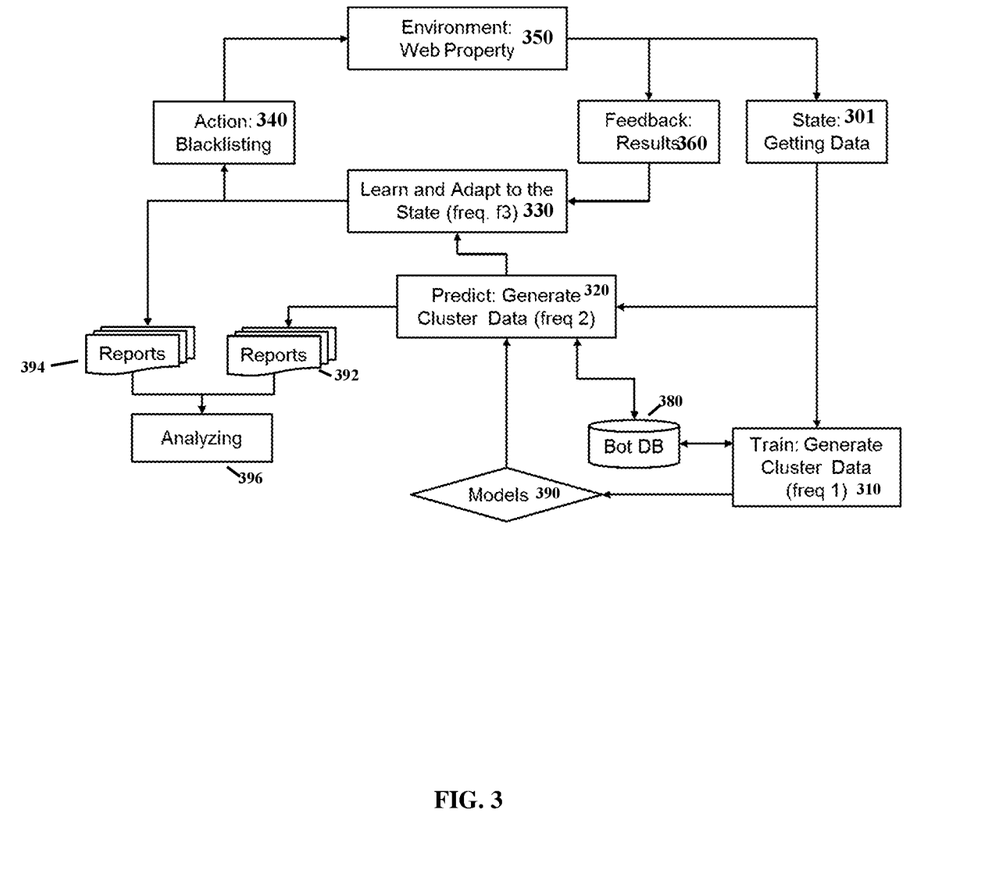
FIG. 3 is a functional block diagram of a bot detection component indicating a workflow of the bot detection component, according to an embodiment herein.

The various components disclosed herein with reference to FIGS. 1, 2, and 3 can be realized in hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

FIG. 3 illustrates an example flow diagram of the operation of a bot detection component according to an embodiment.

At 301, the bot detection component 105j is in the state of getting from one of the web browser circuit 102, server-side connector module 103, and mobile application module. The data received is used to generate cluster data that is used to train the bot detection component 105j at 310, and additionally, may be used to generate primary cluster data for predicting which users are to be blacklisted at 320. The generated cluster data is saved in a bot database 380, and is also used to build models at 390.

Next at 320, the bot detection component 105j is configured to predict which users are to be blacklisted, based on data drawn from the bot DB 380 and the models 390. Additional secondary cluster data may be generated here, and primary reports 392 may be created based on the prediction and generation.

Afterwards, at 330, based on the predictions made in 320 using the primary and secondary cluster data, the bot detection component 105j may be configured to learn and adapt a state determined based on the cluster data generated previously. Secondary report 394 may be generated based on the learn and adapt to the state phase 320. This secondary report 394 may then be analyzed with the primary reports 392 generated from the cluster data at the prediction stage 320.

Next, at 340, blacklisting is performed based on the cluster data used at the analysis done at the learn and adapt stage 330.

At 350, the web property and the surrounding environment is assessed post-blacklisting. The result is used as feedback 360 to be fed back to update the learn and adapt stage 330 for the bot detection component 105. Information of the web environment gathered here can also be used to regenerate cluster data at 301 and 310, and the workflow of the iteration is repeated.

In some configurations, the bot detection component can be realized in a server or system deployed in a data center, a cloud computing platform, or on-premises. An example block diagram of the bot detection component is discussed with reference to FIG. 6.

Figure 4:
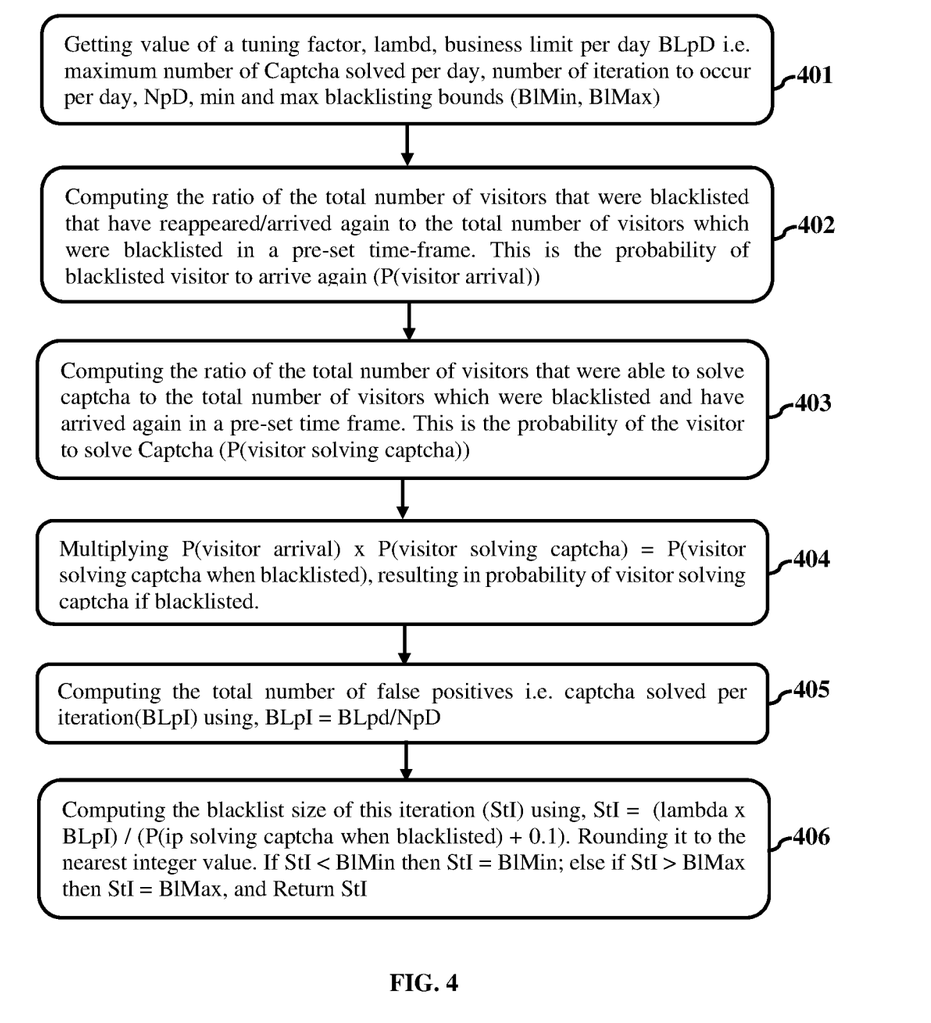
FIG. 4 is a flowchart for a method for computing the number of visitors to blacklist in an iteration, according to an embodiment herein.

FIG. 4 illustrates an example flowchart 400 for a method for computing the number of visitors to blacklist in an iteration, which may be performed by the bot detection component 105j. At step 401, values of a tuning factor, (lambda); Business Limit Per Day (BLpD) (i.e., the maximum number of CAPTCHA solved per day); the number of iteration to occur per day, (NpD), and Min and Max Blacklisting bounds (BlMin, BlMax) are determined.

At 402, a ratio of the total number of visitors that were blacklisted that have reappeared/arrived again, to the total number of visitors which were blacklisted in a pre-set time-frame is determined. This is the probability of blacklisted visitor having arrived again (P(visitor arrival)).

At 403, a ratio of the total number of visitors that were able to solve CAPTCHA, to the total number of visitors who were blacklisted and have arrived again in a pre-set time frame is determined. This is the probability of the visitor to solve CAPTCHA (P(visitor solving CAPTCHA)).

At 404, the probability of blacklisted visitors having arrived again is multiplied with the probability of the visitor to solve CAPTCHA to determine a probability of visitor solving CAPTCHA if blacklisted (P(visitor arrival)×P(visitor solving CAPTCHA)=P(visitor solving captcha when blacklisted).

At 405, a total number of false positives is determined, (i.e. CAPTCHA solved per iteration (BLpI)). Here, BLpI=BLpd/NpD.

At 406, the blacklist size of this iteration StI is determined, where StI=(lambda×BLpI)/(P(ip solving captcha when blacklisted)+0.1). Here, the results are rounded to the nearest integer value. If StI<BlMin then StI=BlMin. Otherwise, if StI>BlMax, then StI=BlMax. The blacklist size of this iteration StI is then returned as the result.

Figure 5:
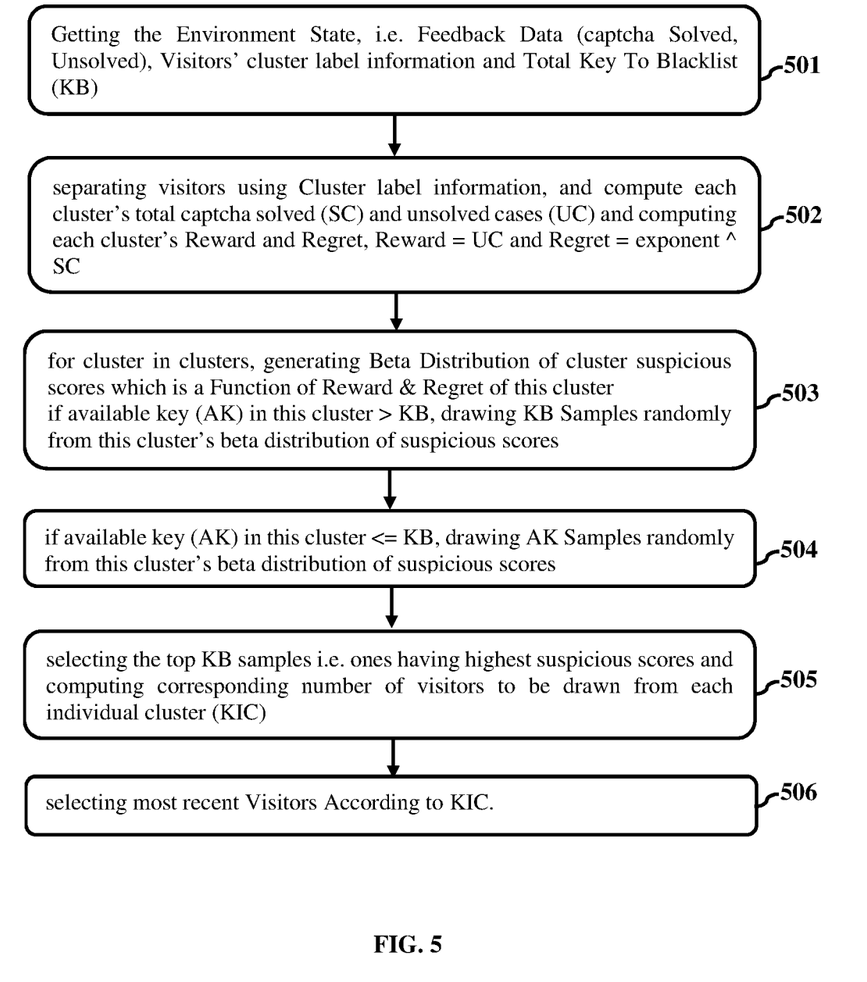
FIG. 5 is a flowchart for a method for selecting visitors from clusters, according to an embodiment herein.

FIG. 5 illustrates an example flowchart 500 for a method for selecting visitors from clusters, according to one embodiment of the embodiments herein.

At 501, an environment state is determined. That is, a feedback data (CAPTCHA Solved, Unsolved), Visitors' cluster label information, and Total Key To Blacklist (KB) may be received.

At 502, Cluster label information is used to separate visitors, and each cluster's total CAPTCHA solved (SC) and unsolved cases (UC) are determined. Next, each cluster's Reward and Regret is determined, where, Reward=UC, and Regret=exponent∧SC.

At 503, for cluster in clusters, a Beta Distribution of cluster suspicious score is generated, which is a function of Reward & Regret of this cluster. If there are available key (AK) in this cluster that is more than the Total Key to Blacklist KB, KB Samples are drawn randomly from this cluster's beta distribution of suspicious score.

At 504, if it is determined that the available key (AK) in this cluster is less than or equal to KB, AK Samples are drawn randomly from this cluster's beta distribution of suspicious score.

At 505, top KB samples is selected. That is, the top KB samples are ones having highest suspicious scores. Next, corresponding number of visitors to be drawn from each individual cluster (KIC)

At 506, most recent visitors is selected according to the individual cluster KIC.

Although the embodiments herein are described with various specific embodiments, it will be obvious for a person skilled in the art to practice the embodiments herein with modifications.

Figure 6:
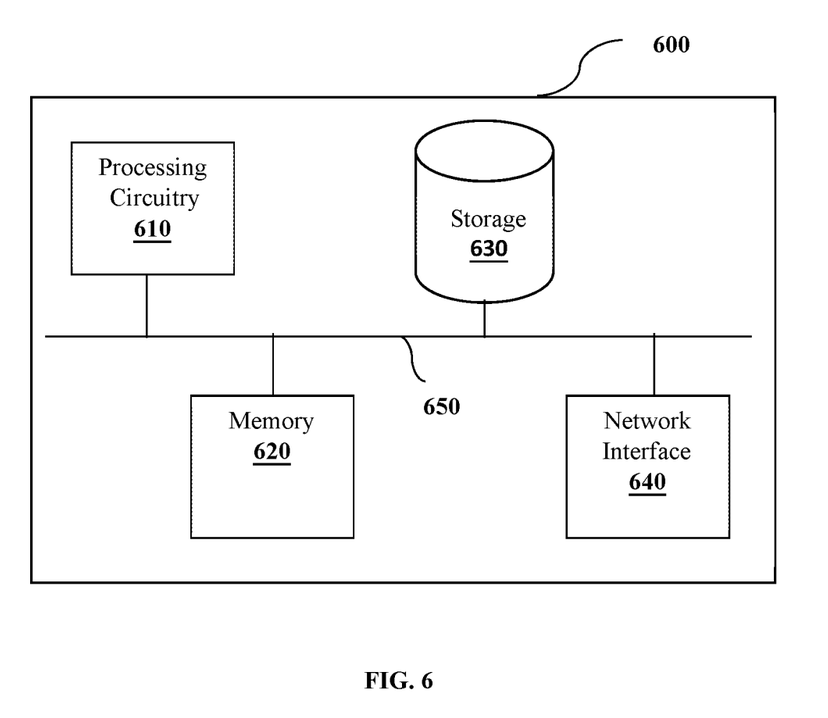

FIG. 6 is an example schematic diagram of a bot detection system 600 according to an embodiment. The system 600 includes a processing circuitry 610 coupled to a memory 620, a storage 630, and a network interface 640. In an embodiment, the components of the system 600 may be communicatively connected via a bus 650.

The processing circuitry 610 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 620 may be volatile (e.g., RAM, etc.), non-volatile (e.g., ROM, flash memory, etc.), or a combination thereof. In one configuration, computer readable instructions to implement one or more embodiments disclosed herein may be stored in the storage 630.

In another embodiment, the memory 620 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 610, cause the processing circuitry 610 to perform the various processes described herein for bot detection and blocking.

The storage 630 may be magnetic storage, optical storage, and the like, and may be realized, for example, as flash memory or other memory technology, CD-ROM, Digital Versatile Disks (DVDs), or any other medium which can be used to store the desired information.

The network interface 640 allows the system 600 to communicate with various components to receive past and current labeled data, block blacklisted visitor and communicate with other sources for reporting. The network interface 640 may allow communication over wired and/or wireless networks.

It should be understood that the embodiments described herein are not limited to the specific architecture illustrated in FIG. 6, and other architectures may be equally used without departing from the scope of the disclosed embodiments.

The various embodiments of the embodiments herein provide a system and method for automatically detecting bots using iterative clustering and feedback-driven adaptive learning. This system includes two main components, Iterative Clustering and Learning based System to Separate Traffic Apart component (ICLSSTA) and Adaptive Action Taking component (AAT). ICLSSTA generates behavior-based clusters using unsupervised learning and AAT is a feedback-driven adaptive learning-based action taker. AAT utilizes past feedback received from a data stream and uses it to bootstrap reward and regret of the generated clusters. That is, the AAT makes use of either only the feedback of the visitors blacklisted by it or the feedback generated because of all bot detection systems. The AAT when executed for the first time with the configuration of using only those feedback for the visitors blacklisted by it, starts by using random sampling. It blacklists a certain small number of visitors from each group and proceed iteratively based on the feedback from this iteration.

The foregoing description of the specific embodiments will so fully reveal the general nature of the embodiments herein that others can, by applying current knowledge, readily modify and/or adapt for various applications such as specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modifications. However, all such modifications are deemed to be within the scope of the claims.

The scope of the embodiments will be ascertained by the claims to be submitted at the time of filing a complete specification.

What is claimed is:

1. A method for detecting and blocking bots, comprising:
   receiving unlabeled data regarding a visitor of a web source;
   grouping the received unlabeled data with similar characteristics into a group of data;
   detecting, based on the group of data, at least one anomaly; and
   determining, based on the at least one detected anomaly, a number of visitors to be blacklisted; and
   storing the determined number of visitors to be blacklisted in a database;
   wherein determining the number of visitors to be blacklisted further comprises:
   identifying a cluster group and determining at least one tuning factor;

determining a probability of a blacklisted visitor to arrive again;
determining a probability of the visitor to solve CAPTCHA;
determining a probability of the visitor solving captcha when blacklisted;
determining a total number of false positive; and
determining blacklist size of this iteration.

2. The method of claim 1, wherein the detected—at least one anomaly further comprises:
any one of a conceptual drift and a clustering of the group of data in a database,
wherein the conceptual drift is a change in a relationship between input and output over a predetermined period of time.

3. The method of claim 1, further comprising:
providing feedback to an adaptive learning component to train a bot detection component.

4. The method of claim 1, further comprising:
blocking each visitor added to the blacklist.

5. The method of claim 1, wherein the at least one tuning factor is any one of:
business limit per day (BLpD);
number of iterations to occur per day (NpD);
minimum blacklisting bound; or
maximum blacklisting bound.

6. The method of claim 1, wherein determining of the probability of the blacklisted visitor having arrive again further comprises:
determining a ratio of a total number of visitors that were blacklisted that have reappeared to a total number of visitors which were blacklisted in a predetermined timeframe.

7. The method of claim 5, wherein the at least one tuning factor includes both the business limit per day (BLpD) and the number of iterations to occur per day (NpD), and wherein the total number of false positives is determined by dividing the Business Limit per Day (BLpD) by the number of iterations to occur per day (NpD).

8. The method of claim 1, wherein determining of the probability of the visitor to solve CAPTCHA further comprises:
determining a ratio of a total number of visitors that were able to solve CAPTCHA to the total number of visitors who were blacklisted and have arrived again within a predetermined time frame.

9. The method of claim 1, wherein determining probability of the visitor solving CAPTCHA when blacklisted further comprises:
multiplying the probability of blacklisted visitors having arrived again with the probability of the visitor to solve CAPTCHA.

10. A non-transitory computer readable medium having stored thereon instructions for causing a processing circuitry to execute a process, the process comprising:
receiving unlabeled data regarding a visitor of a web source;
grouping the received unlabeled data with similar characteristics into a group of data;
detecting, based on the group of data, at least one anomaly;
determining, based on the at least one detected anomaly, a number of visitors to be blacklisted; and
storing the determined number of visitors to be blacklisted in a database;
wherein determining the number of visitors to be blacklisted further comprises:
identifying a cluster group and determining at least one tuning factor;
determining a probability of a blacklisted visitor to arrive again;
determining a probability of the visitor to solve CAPTCHA;
determining a probability of the visitor solving captcha when blacklisted;
determining a total number of false positive; and
determining blacklist size of this iteration.

11. The non-transitory computer readable medium of claim 10, wherein the process further comprises:
providing feedback to an adaptive learning component to train a bot detection component.

12. The non-transitory computer readable medium of claim 10, wherein the process further comprises:
blocking each visitor added to the blacklist.

13. A system for detecting bots, comprising:
a processing circuitry; and
a memory, the memory containing instructions that, when executed by the processing circuitry, configure the system to:
receive unlabeled data regarding a visitor of a web source;
group the received unlabeled data with similar characteristics into a group of data;
detect, based on the group of data, at least one anomaly;
determine, based on the at least one detected anomaly, a number of visitors to be blacklisted; and
store the determined number of visitors to be blacklisted to the memory, wherein the system is further configured to:
identify a cluster group and determining at least one tuning factor;
determine a probability of a blacklisted visitor to arrive again;
determine a probability of the visitor to solve CAPTCHA;
determine a probability of the visitor solving captcha when blacklisted;
determine a total number of false positive; and
determine blacklist size of this iteration.

14. The system of claim 13, wherein
the detected at least one anomaly further comprises:
any one of a conceptual drift and a clustering of the group of data in a database,
wherein the conceptual drift is a change in a relationship between input and output over a predetermined period of time.

15. The system of claim 13, wherein the system is further configured to:
provide feedback to an adaptive learning component to train a bot detection component.

16. The system of claim 13, wherein the system is further configured to:
block each visitor added to the blacklist.

17. The system of claim 13, wherein the at least one tuning factor is any one of:
business limit per day (BLpD);
number of iterations to occur per day (NpD);
minimum blacklisting bound; or
maximum blacklisting bound.

18. They system of claim of claim 17, wherein the at least one tuning factor includes both the business limit per day (BLpD) and the number of iterations to occur per day (NpD), and wherein the total number of false positives is determined by dividing the Business Limit per Day (BLpD) by the number of iterations to occur per day (NpD).

19. The system of claim 13, wherein the system is further configured to:
- determine a ratio of a total number of visitors that were blacklisted that have reappeared to a total number of visitors which were blacklisted in a predetermined timeframe.

20. The system of claim 13, wherein the system is further configured to:
- determine a ratio of a total number of visitors that were able to solve CAPTCHA to the total number of visitors who were blacklisted and have arrived again within a predetermined time frame.

21. The system of claim 13, wherein the system is further configured to:
- multiply the probability of blacklisted visitors having arrived again with the probability of the visitor to solve CAPTCHA.

* * * * *